US008458658B2

(12) United States Patent
Faus et al.

(10) Patent No.: US 8,458,658 B2
(45) Date of Patent: Jun. 4, 2013

(54) METHODS AND SYSTEMS FOR DYNAMICALLY BUILDING A SOFTWARE APPLIANCE

(75) Inventors: Norman Lee Faus, Raleigh, NC (US); David P. Huff, Cary, NC (US); Bryan M. Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1496 days.

(21) Appl. No.: 12/040,831

(22) Filed: Feb. 29, 2008

(65) Prior Publication Data
US 2009/0222805 A1 Sep. 3, 2009

(51) Int. Cl.
G06F 9/44 (2006.01)
G06F 9/445 (2006.01)

(52) U.S. Cl.
USPC .................. 717/121; 717/106; 717/174

(58) Field of Classification Search
None
See application file for complete search history.

(56) References Cited

U.S. PATENT DOCUMENTS

| | | | |
|---|---|---|---|
| 6,367,077 B1 | 4/2002 | Brodersen et al. | |
| 6,463,457 B1 | 10/2002 | Armentrout | |
| 6,578,199 B1 | 6/2003 | Tsou et al. | |
| 7,140,028 B2 * | 11/2006 | Bentley et al. | 719/319 |
| 7,313,796 B2 | 12/2007 | Hamilton | |
| 7,439,937 B2 | 10/2008 | Ben-Shachar | |
| 7,461,095 B2 | 12/2008 | Cohen et al. | |
| 7,529,785 B1 | 5/2009 | Spertus | |
| 7,546,462 B2 | 6/2009 | Upton | |
| 7,577,722 B1 * | 8/2009 | Khandekar et al. | 709/220 |
| 7,596,620 B1 | 9/2009 | Colton | |
| 7,624,394 B1 | 11/2009 | Christopher, Jr. | |
| 7,793,288 B2 | 9/2010 | Sameske | |
| 7,886,038 B2 | 2/2011 | Ferris | |
| 8,108,912 B2 | 1/2012 | Ferris | |
| 8,176,094 B2 * | 5/2012 | Friedman | 707/803 |
| 8,201,144 B2 * | 6/2012 | Rogers et al. | 717/121 |
| 8,239,509 B2 * | 8/2012 | Ferris et al. | 717/171 |
| 2001/0039497 A1 | 11/2001 | Hubbard | |
| 2002/0069276 A1 | 6/2002 | Hino | |
| 2002/0086688 A1 | 7/2002 | Kang | |
| 2002/0129352 A1 | 9/2002 | Brodersen et al. | |
| 2002/0165819 A1 | 11/2002 | McKnight | |
| 2003/0037258 A1 | 2/2003 | Koren | |
| 2003/0110252 A1 | 6/2003 | Yang-Huffman | |

(Continued)

OTHER PUBLICATIONS

VMware, "Virtual Appliances: A New Paradigm for Software Delivery", 2008 VMware, Inc., pp. 1-14; <http://www.vmware.com/files/pdf/vam/VMware_Virtual_Appliance_Solutions_White_Paper_08Q3.pdf>.*

(Continued)

Primary Examiner — Thuy Dao
Assistant Examiner — Ben C Wang
(74) Attorney, Agent, or Firm — Lowenstein Sandler LLP

(57) ABSTRACT

An application support module can be configured to dynamically build software appliances for users. The application support module can be configured to build the software appliances based on a request by a user. The request can include a desired pre-built appliance or available applications to be included in a custom appliance. Once the requested appliance is built, the application support module can be configured determine operating requirements for the complete software appliance. The operating requirements can include the minimum necessary computing requirements to utilize the software appliance, such as required storage space, required processing power, required execution memory. The application support module can be configured to provide the software appliance to the user, if the user accepts the software appliance. Additionally, the application support module can be configured to repeat the building process if the user requests reconfiguration.

23 Claims, 9 Drawing Sheets

U.S. PATENT DOCUMENTS

| | | | |
|---|---|---|---|
| 2003/0121024 A1* | 6/2003 | Hill et al. | 717/107 |
| 2003/0135609 A1 | 7/2003 | Carlson | |
| 2004/0162902 A1 | 8/2004 | Davis | |
| 2004/0177342 A1* | 9/2004 | Worley, Jr. | 717/121 |
| 2004/0181773 A1* | 9/2004 | Mortensen et al. | 717/106 |
| 2004/0210591 A1 | 10/2004 | Hirschfeld | |
| 2004/0210627 A1 | 10/2004 | Kroening | |
| 2004/0268347 A1 | 12/2004 | Knauerhase | |
| 2005/0044541 A1 | 2/2005 | Parthasarathy et al. | |
| 2005/0071847 A1* | 3/2005 | Bentley et al. | 719/310 |
| 2005/0131898 A1 | 6/2005 | Fatula | |
| 2005/0144060 A1 | 6/2005 | Chen | |
| 2005/0182727 A1 | 8/2005 | Robert | |
| 2005/0198628 A1* | 9/2005 | Graham et al. | 717/174 |
| 2005/0262549 A1 | 11/2005 | Ritt et al. | |
| 2005/0289540 A1 | 12/2005 | Nguyen | |
| 2006/0031598 A1 | 2/2006 | Blanchard et al. | |
| 2006/0075042 A1 | 4/2006 | Wang | |
| 2006/0085530 A1 | 4/2006 | Garrett | |
| 2006/0085824 A1 | 4/2006 | Bruck | |
| 2006/0130144 A1 | 6/2006 | Wernicke | |
| 2006/0177058 A1 | 8/2006 | Sarwono | |
| 2006/0224436 A1 | 10/2006 | Matsumoto | |
| 2006/0277542 A1* | 12/2006 | Wipfel | 717/174 |
| 2007/0011291 A1 | 1/2007 | Mi | |
| 2007/0028001 A1 | 2/2007 | Phillips | |
| 2007/0074201 A1 | 3/2007 | Lee | |
| 2007/0101116 A1 | 5/2007 | Tsuji | |
| 2007/0150865 A1* | 6/2007 | Rajput | 717/121 |
| 2007/0168926 A1* | 7/2007 | Rajah et al. | 717/106 |
| 2007/0168962 A1* | 7/2007 | Heinke et al. | 717/120 |
| 2007/0169079 A1 | 7/2007 | Keller et al. | |
| 2007/0226715 A1 | 9/2007 | Kimura | |
| 2007/0245332 A1 | 10/2007 | Tal et al. | |
| 2007/0283282 A1 | 12/2007 | Bonfiglio | |
| 2007/0294676 A1 | 12/2007 | Mellor | |
| 2008/0022271 A1 | 1/2008 | D'Angelo et al. | |
| 2008/0052384 A1 | 2/2008 | Marl et al. | |
| 2008/0080396 A1 | 4/2008 | Meijer | |
| 2008/0080718 A1 | 4/2008 | Meijer | |
| 2008/0082538 A1 | 4/2008 | Meijer | |
| 2008/0082601 A1 | 4/2008 | Meijer | |
| 2008/0083025 A1 | 4/2008 | Meijer | |
| 2008/0083040 A1 | 4/2008 | Dani | |
| 2008/0086727 A1 | 4/2008 | Lam | |
| 2008/0091613 A1 | 4/2008 | Gates | |
| 2008/0104608 A1 | 5/2008 | Hyser | |
| 2008/0127087 A1* | 5/2008 | Brookins et al. | 717/121 |
| 2008/0215796 A1 | 9/2008 | Lam | |
| 2008/0240150 A1 | 10/2008 | Dias | |
| 2008/0256516 A1* | 10/2008 | Chaar et al. | 717/121 |
| 2009/0012885 A1 | 1/2009 | Cahn | |
| 2009/0013061 A1 | 1/2009 | Winter et al. | |
| 2009/0025006 A1 | 1/2009 | Waldspurger | |
| 2009/0037496 A1 | 2/2009 | Chong | |
| 2009/0064086 A1 | 3/2009 | Faus | |
| 2009/0089078 A1 | 4/2009 | Bursey | |
| 2009/0089407 A1* | 4/2009 | Chalupa et al. | 709/220 |
| 2009/0089738 A1* | 4/2009 | Krueger et al. | 717/121 |
| 2009/0099940 A1 | 4/2009 | Frederick | |
| 2009/0132695 A1 | 5/2009 | Surtani | |
| 2009/0144718 A1* | 6/2009 | Boggs et al. | 717/170 |
| 2009/0177514 A1 | 7/2009 | Hudis | |
| 2009/0210527 A1 | 8/2009 | Kawato | |
| 2009/0210869 A1* | 8/2009 | Gebhart et al. | 717/174 |
| 2009/0210875 A1 | 8/2009 | Bolles | |
| 2009/0217267 A1 | 8/2009 | Gebhart | |
| 2009/0222805 A1 | 9/2009 | Faus | |
| 2009/0222806 A1 | 9/2009 | Faus | |
| 2009/0222808 A1 | 9/2009 | Faus | |
| 2009/0228950 A1 | 9/2009 | Reed | |
| 2009/0248693 A1 | 10/2009 | Sagar | |
| 2009/0249279 A1* | 10/2009 | Bourdon | 717/101 |
| 2009/0249287 A1 | 10/2009 | Patrick | |
| 2009/0249488 A1 | 10/2009 | Robinson et al. | |
| 2009/0260007 A1 | 10/2009 | Beaty | |
| 2009/0265707 A1 | 10/2009 | Goodman | |
| 2009/0271324 A1 | 10/2009 | Jandhyala | |
| 2009/0276771 A1 | 11/2009 | Nickolov | |
| 2009/0287691 A1 | 11/2009 | Sundaresan | |
| 2009/0293056 A1 | 11/2009 | Ferris | |
| 2009/0299905 A1 | 12/2009 | Mestha | |
| 2009/0299920 A1* | 12/2009 | Ferris et al. | 717/120 |
| 2009/0300057 A1* | 12/2009 | Friedman | 707/102 |
| 2009/0300149 A1 | 12/2009 | Ferris | |
| 2009/0300151 A1 | 12/2009 | Friedman | |
| 2009/0300152 A1 | 12/2009 | Ferris | |
| 2009/0300164 A1 | 12/2009 | Boggs | |
| 2009/0300169 A1 | 12/2009 | Sagar | |
| 2009/0300210 A1 | 12/2009 | Ferris | |
| 2009/0300423 A1 | 12/2009 | Ferris | |
| 2009/0300584 A1 | 12/2009 | Faus | |
| 2009/0300593 A1* | 12/2009 | Faus et al. | 717/168 |
| 2009/0300601 A1 | 12/2009 | Faus | |
| 2009/0300607 A1 | 12/2009 | Ferris | |
| 2009/0300608 A1 | 12/2009 | Ferris | |
| 2009/0300635 A1 | 12/2009 | Ferris | |
| 2009/0300641 A1 | 12/2009 | Friedman | |
| 2009/0300719 A1 | 12/2009 | Ferris | |
| 2009/0327683 A1 | 12/2009 | Cabot et al. | |
| 2010/0031234 A1* | 2/2010 | Chaar et al. | 717/113 |
| 2010/0042720 A1 | 2/2010 | Stienhans | |
| 2010/0050172 A1 | 2/2010 | Ferris | |
| 2010/0057831 A1 | 3/2010 | Williamson | |
| 2010/0058347 A1 | 3/2010 | Smith | |
| 2010/0095270 A1* | 4/2010 | Seitz et al. | 717/121 |
| 2010/0131324 A1 | 5/2010 | Ferris | |
| 2010/0131590 A1 | 5/2010 | Coleman | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans | |
| 2010/0217850 A1 | 8/2010 | Ferris | |
| 2010/0217864 A1 | 8/2010 | Ferris | |
| 2010/0217865 A1 | 8/2010 | Ferris | |
| 2010/0218237 A1 | 8/2010 | Ferris | |
| 2010/0220622 A1 | 9/2010 | Wei | |
| 2010/0235482 A1* | 9/2010 | Chalupa et al. | 709/222 |
| 2010/0235813 A1* | 9/2010 | Manczak et al. | 717/121 |
| 2010/0299366 A1 | 11/2010 | Stienhans | |
| 2010/0306354 A1 | 12/2010 | DeHaan | |
| 2010/0306377 A1 | 12/2010 | DeHaan | |
| 2010/0306379 A1 | 12/2010 | Ferris | |
| 2010/0306566 A1 | 12/2010 | DeHaan | |
| 2010/0306765 A1 | 12/2010 | DeHaan | |
| 2010/0306767 A1 | 12/2010 | DeHaan | |
| 2011/0004676 A1* | 1/2011 | Kawato | 709/221 |
| 2011/0010420 A1 | 1/2011 | Kagitani | |
| 2011/0016214 A1 | 1/2011 | Jackson | |
| 2011/0055034 A1 | 3/2011 | Ferris | |
| 2011/0055377 A1 | 3/2011 | DeHaan | |
| 2011/0055378 A1 | 3/2011 | Ferris | |
| 2011/0055396 A1 | 3/2011 | DeHaan | |
| 2011/0055398 A1 | 3/2011 | DeHaan | |
| 2011/0055588 A1 | 3/2011 | DeHaan | |
| 2011/0107103 A1 | 5/2011 | DeHaan | |
| 2011/0119651 A1* | 5/2011 | Utschig-Utschig et al. | 717/106 |
| 2011/0131134 A1 | 6/2011 | Ferris | |
| 2011/0131306 A1 | 6/2011 | Ferris | |
| 2011/0131315 A1 | 6/2011 | Ferris | |
| 2011/0131316 A1 | 6/2011 | Ferris | |
| 2011/0131335 A1 | 6/2011 | Spaltro | |
| 2011/0131499 A1 | 6/2011 | Ferris | |
| 2011/0167408 A1* | 7/2011 | Harmon | 717/121 |
| 2011/0213686 A1 | 9/2011 | Ferris | |
| 2011/0213687 A1 | 9/2011 | Ferris | |
| 2011/0213691 A1 | 9/2011 | Ferris | |
| 2011/0213713 A1 | 9/2011 | Ferris | |
| 2011/0213719 A1 | 9/2011 | Ferris | |
| 2011/0213875 A1 | 9/2011 | Ferris | |
| 2011/0213884 A1 | 9/2011 | Ferris | |
| 2011/0214124 A1 | 9/2011 | Ferris | |
| 2011/0239190 A1* | 9/2011 | Mueller et al. | 717/121 |

| | | |
|---|---|---|
| 2012/0131195 A1 | 5/2012 | Morgan |
| 2012/0246639 A1* | 9/2012 | Kashyap et al. .................. 718/1 |
| 2012/0260229 A1* | 10/2012 | Peraza et al. .................. 717/105 |

OTHER PUBLICATIONS

VMware, "Best Practices for Building Virtual Appliances", 2007 VMware, Inc., pp. 1-7; <http://www.vmware.com/files/pdf/Best_Practices_Building_Virtual_Appliances.pdf>.*

VMware, "User's Guide to Deploying vApps and Virtual Appliances", 2010 VMware, pp. 1-28; <http://www.vmware.com/support/developer/studio/studio21/va_user.pdf>.*

Huan Liu, "Rapid Application Configuration in Amazon Cloud using Configurable Virtual Appliances", 2011 ACM, SAC'11 Mar. 21-25, 2011, Taiwan, pp. 147-154; <http://dl.acm.org/citation.cfm?id=1982185.1982221&coll=DL&dl=GUIDE&CFID=268649706&CFTOKEN=27442775>.*

Weis et al., "Customizable Pervasive Applications", 2006 IEEE, PERCOM'06, pp. 1-6; <http://ieeexplore.ieee.org/stamp/stamp.jsp?tp=&arnumber=1604813>.*

"rBuilder and the rPath Appliance Platform", Feb. 12, 2007, rPath, Inc., www.rpath.com, 2 pages.

White Paper—"Best Practices for Building Virtual Appliances", Nov. 15, 2007, rPath, Inc., www.rpath.com, 8 pages.

Red Hat, Inc. Office Action for U.S. Appl. No. 12/128,787 mailed Mar. 4, 2010.

Red Hat, Inc. Final Office Action for U.S. Appl. No. 12/128,787 mailed Nov. 8, 2010.

Red Hat, Inc. Office Action for U.S. Appl. No. 12/128,787 mailed Aug. 1, 2011.

Red Hat, Inc. Advisory Action for U.S. Appl. No. 12/128,787 mailed Jan. 20, 2011.

Final Office Action for U.S. Appl. No. 12/128,787 mailed Nov. 22, 2011.

Office Action for U.S. Appl. No. 12/128,787 mailed May 24, 2012.

Office Action for U.S. Appl. No. 12/128,787 mailed Sep. 14, 2012.

Office Action for U.S. Appl. No. 12/324,563 mailed May 31, 2011.

Final Office Action for U.S. Appl. No. 12/324,563 mailed Jan. 18, 2012.

Office Action for U.S. Appl. No. 12/551,517 mailed Dec. 21, 2011.

Office Action for U.S. Appl. No. 12/551,517 mailed Jul. 23, 2012.

* cited by examiner

METHODS AND SYSTEMS FOR DYNAMICALLY BUILDING A SOFTWARE APPLIANCE

FIELD

This invention relates generally to products and services, more particularly, to systems and methods for software appliance related services and products.

DESCRIPTION OF THE RELATED ART

The proliferation of the World Wide Web through the Internet has made a wealth of products and services available to users to purchase and use nearly instantaneously. Vendors, service providers, manufacturers, third party distributors, etc., may have websites for the users to review and purchase their respective products and/or services and to obtain technical support for the product and/or services.

Although most computers come pre-configured with some computer software, most users must install and/or configure additional computer software on their computer to tailor their computer for their particular needs. Such computer software installation and/or configuration can be as easy as a one step activation of an installation program. Because of this complex nature, the post install configuration can not be automated without some level of user interaction or knowledge of the pre-existing system. However, in order to make software truly operational, more complex computer applications require a user to perform post-installation configuration of the software.

Additionally, most software is designed to meet the needs of a wide range users. As such, the software is designed to include features and components to addresses all requirements. For example, operating systems (OS) are designed to be universally compatible with a multitude of applications and compatible with different computing system. Unfortunately, the universal nature of the software has caused the size and cost of the software to increase dramatically. For example, OS may be many gigabytes in size.

However, most users do not require all the features and components offered by typical software. As such, the user wastes space and resources on the features and components not utilized for their particular need. Thus, there is a need in the art for methods and system that provide software that is specifically tailored to users.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

An application support module can be configured to dynamically build software appliances for users. The application support module can be configured to build the software appliances based on a request by a user. The request can include a desired pre-built appliance or available applications to be included in a custom appliance. The application support module can be configured to build the requested appliance, by retrieving the pre-configured appliance. Additionally, to build the custom appliance, the application support module can be configured to combine the applications with a minimum amount of an operating system to provide an execution platform for the applications.

Once the requested appliance is built, the application support module can be configured determine operating requirements for the complete software appliance. The operating requirements can include the minimum necessary computing requirements to utilize the software appliance, such as required storage space, required processing power, required execution memory.

Based on the minimum requirements, the user can accept the software appliance or request to reconfigure the software appliance. The application support module can be configured to provide the software appliance to the user, if the user accepts the software appliance. Additionally, the application support module can be configured to repeat the building process if the user requests reconfiguration.

By allowing a user to construct an appliance with specific or customized functionality, the user is not required to purchase and install unnecessary software. Accordingly, the user can implement the software appliance and reap the benefit of less space and reduced cost.

Figure 1:
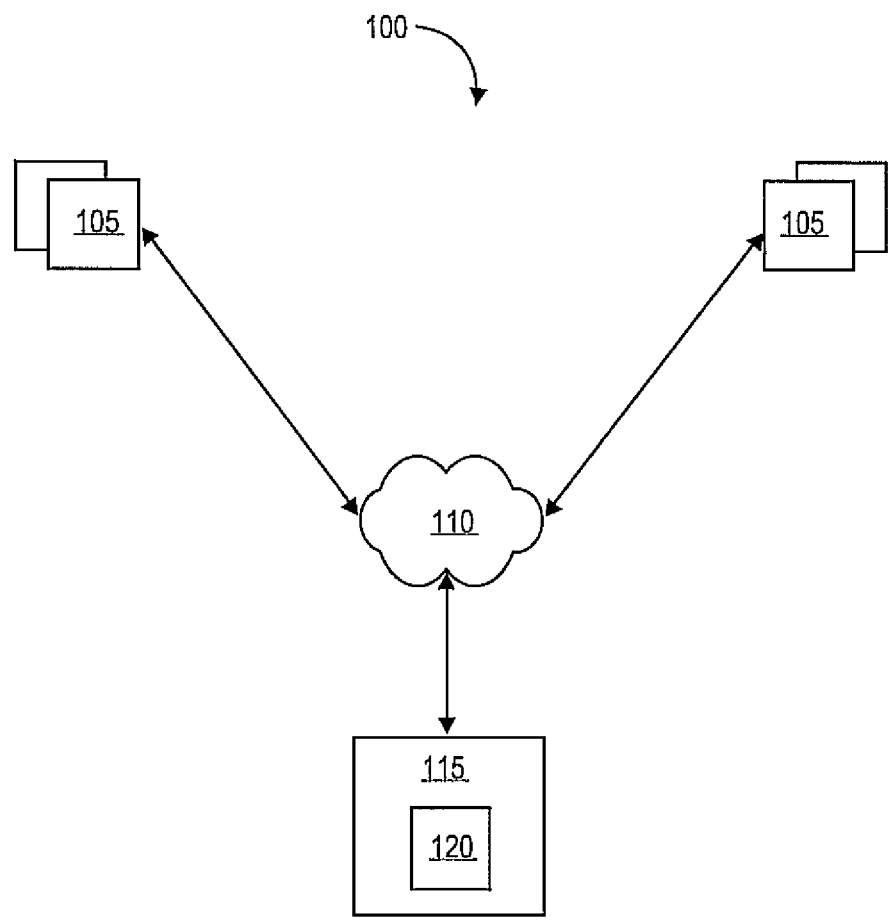
FIG. 1 depicts an exemplary system in accordance with an embodiment.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1 system 100 includes users 105, a network 110 and a web service portal 115. Users 105 can be private individuals, employees of private business or public entities or other persons interested in accessing web service portal 115. Users 105 can access web service portal 115 using personal computers, personal mobile devices, workstations or other networked computing platforms.

Network 110 can be a combination of wide area and local area networks such as the Internet. Network 110 can be configured to provide a communication channel between users 105 and web service portal 115. Network 110 can implement a variety of network protocols to provide the communication channel such as Internet Protocol ("IP") Vx, Asynchronous Transfer Mode (ATM), Synchronous Optical Networking (SONET), or other similar network protocols.

Web service portal 115 can be configured to provide products and services to user 105 as well as provisioning, installation services, updates to software and hardware products and technical support. Web service portal 115 can, among other functions, provide a list of products such as software applications, software appliances and/or hardware devices as well as services such as installation, configuration, maintenance, etc., for users 105 to purchase. As a non-limiting example, web service portal 115 can also provide information for users to research, compare and purchase software, hardware and consulting services in support of those software and/or hardware purchases. Web service portal 115 can also be configured to provide support services, for free or by subscription, to those same software, service, and/or hardware purchases.

In accordance with various embodiments, web service portal 115 can be configured to provide an appliance support (AS) module 120 to provide software appliances to user 105 and support the software appliances.

Figure 2:
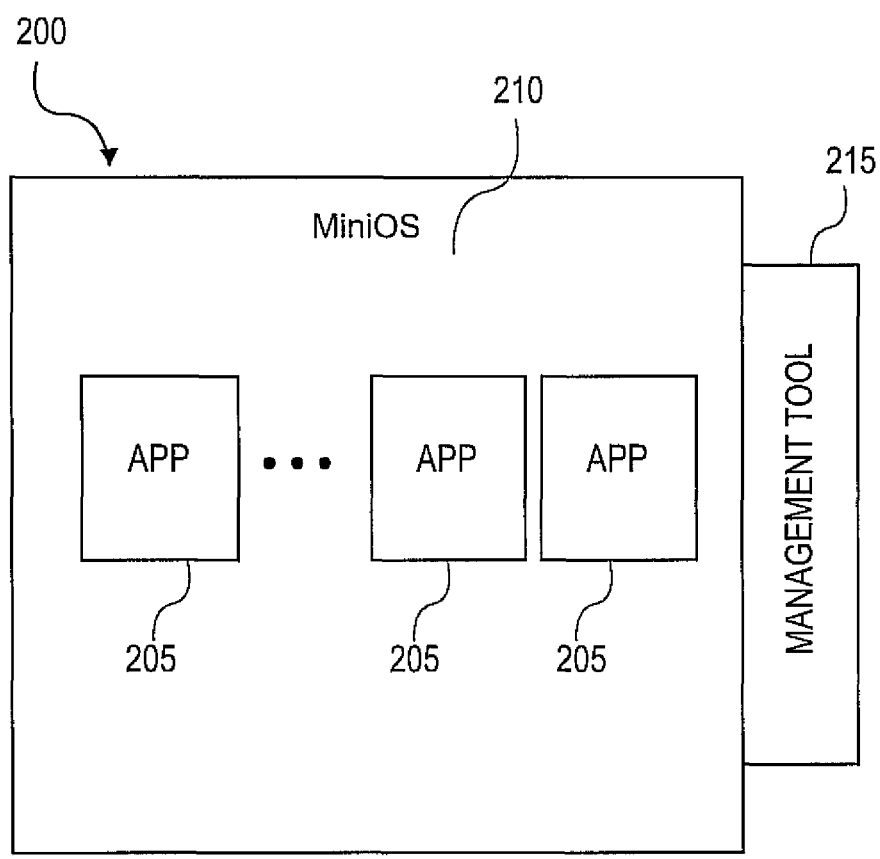
FIG. 2 illustrates an exemplary software appliance in accordance with various embodiments.

FIG. 2 shows an exemplary software appliance according to various embodiments. As shown, a software appliance 200 can comprise one or more applications 205 combined with a "minimum amount of an operating system" (MiniOS) 210 to allow application(s) 205 to run on a computing platform or in a virtual machine executing on a computing platform. MiniOS 210 can comprise a subset of the components of a complete OS that contains enough resources to support the application(s) 205 intended to be encapsulated with MiniOS 210. Software appliance 200 occupies less space than regular or self-standing applications and independent OSes, because MiniOS 210 includes a set of reduced features and components required to provide an application space for application(s) 205 of the software appliance.

Software appliance 200 comprises a binary image of application(s) 205 and selected MiniOS 210 contained in software appliance 200. The image contains the bits of software appliance 200 as installed on a computing platform. As such, to place software appliance 200 on computing platform, software appliance 200 only needs to be physically copied to the memory or storage of the computing platform and, then, configured to function with the computing platform or virtual machine running on the computing platform. In embodiments, software appliance 200 can be distributed via media such as CD-ROM, DVD-ROM, high-definition format discs or flash media, transmitted via a network, or can be downloaded from a Web site or other location.

Software appliance 200 can streamline the distribution of applications by minimizing the tasks typically associated with installation, configuration and maintenance. Software appliance 200 is completely functional as a self-contained unit, and requires no separately installed or configured OS to function. Inside software appliance 200, application(s) 205 and MiniOS 210 are pre-configured to function and operate together. As such, once software appliance 200 is placed on a computing platform or virtual machine, software appliance 200 only requires a configuration of the software appliance to the computing platform or virtual machine.

Additionally, software appliance 200 can be pre-configured for a specific client or computing platform on which it will be placed. Specifically, during creation of software appliance 200, MiniOS 210 and application(s) 205 of software appliance 200 can be pre-configured with the settings and parameters of the client or computing platform on which it will be placed. For example, if software appliance 200 includes a server OS and Email server application, the server OS and Email server application can be pre-configured to operate with the network settings of the computing platform it be placed and the network it will serve. Accordingly, software appliance 200 needs only to be placed on the target client or computing platform without additional configuration. In embodiments, software appliance 200 can be installed to a variety of clients, servers or other target devices, such as network servers, personal computers, network-enabled cellular telephones, personal digital assistants, media players, and others, such as illustrated in FIG. 1 above.

Software appliance 200 can also be updated and upgraded in by several different processes. Since software appliance 200 is a binary image, an updated or upgraded software appliance can be created as a completely new binary image of the entire software appliance incorporating the updates or upgrades. To update or upgrade software appliance 200 using a complete image, the updated or upgraded appliance can simply replace software appliance 200. Alternatively, software appliance 200 can be updated or upgraded incrementally. For each update or upgrade, the bits of the binary image required to update or upgrade software appliance 200 can be determined. To update or upgrade software appliance 200, the update bits can be added to software appliance 200 on a binary-difference basis.

Software appliance 200 can also be configured to communicate with a management tool 215. Management tool 215 can for example be utilized in order to start/stop, configure, repair, and update software appliance 200. Management tool 215 can manage the entire software appliance 200, including both application(s) 205 and MiniOS 210. Likewise, management tool 215 can include multiple tools, for instance to manage application(s) 205 and MiniOS 210, separately.

Management tool 215 can be embedded in software appliance 200 itself. In such implementations, software appliance 200 can be managed from the particular computing platform on which it is placed. Additionally, management tool 215 can be separate from software appliance 200. For example, in a networked environment management tool 215 can be installed on a network server that communicates with one or more clients on the network in which software appliance 200 is installed. In networked implementations, management tool 215 can be configured to manage a set of multiple software appliances 200 across all clients from a single platform.

Returning to FIG. 1, according to various embodiments, AS module 120 can be configured to dynamically build software appliances for users 105. AS module 120 can be configured to build the software appliances based on a request by a user 105. The request can include a desired pre-built appliance or available applications to be included in a custom appliance. AS module 120 can be configured to build the requested appliance by retrieving the pre-configured appliance. Additionally, to build the custom appliance, AS module 120 can be configured to combine the applications with MiniOS to provide an execution platform for the applications.

Once the requested appliance is built, AS module 120 can be configured determine operating requirements for the complete software appliance. The operating requirements can include the minimum necessary computing requirements to utilize the software appliance, such as required storage space, required processing power, required execution memory.

Based on the minimum requirements, user 105 can accept the software appliance or request to reconfigure the software appliance. AS module 120 can be configured to provide the software appliance to user 105, if the user accepts the software appliance. Additionally, AS module 120 can be configured to repeat the building process if the user requests reconfiguration.

Figure 3:
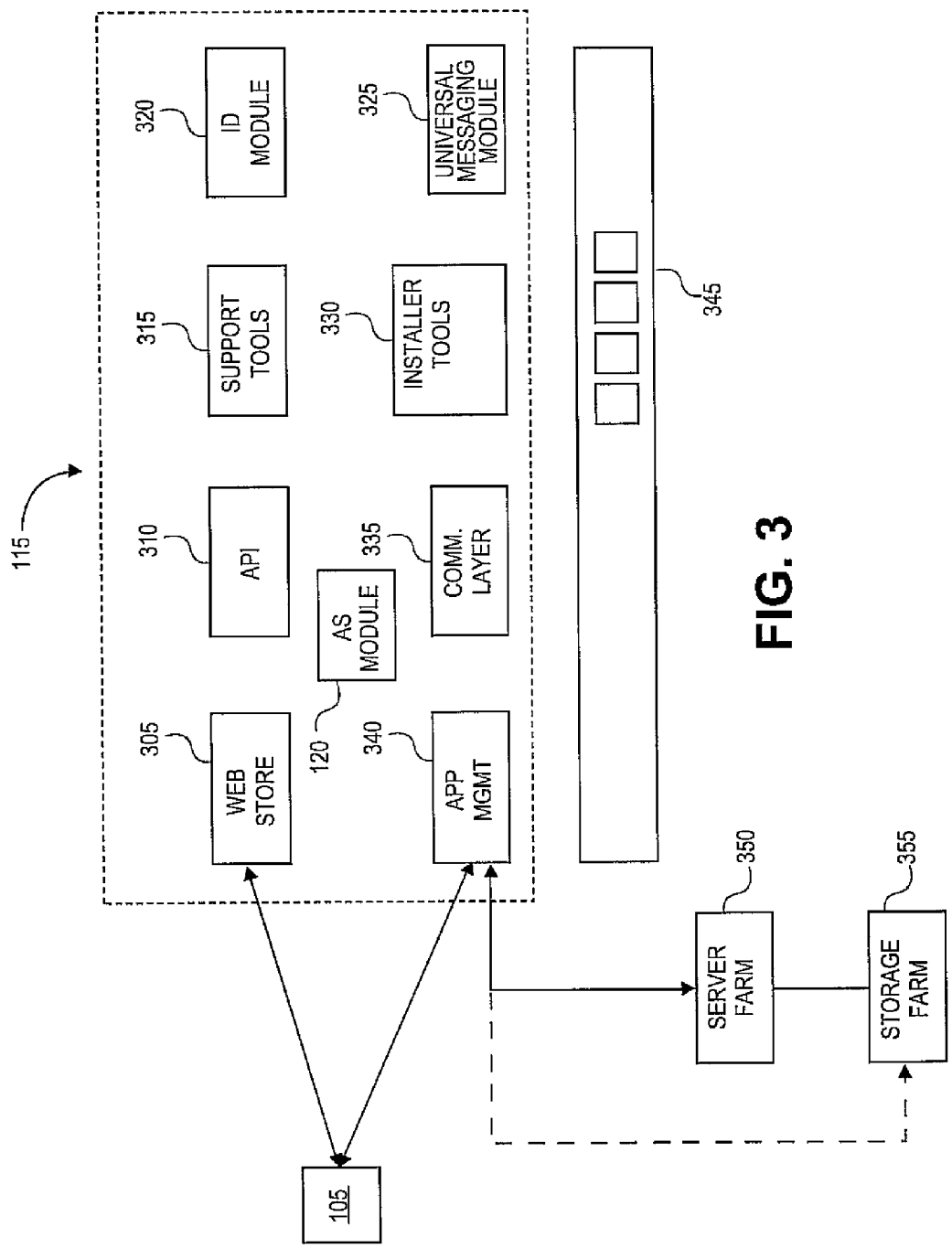
FIG. 3 illustrates an exemplary service portal of the system shown in FIG. 1 in accordance with another embodiment.

FIG. 3 illustrates a more detailed block diagram of web service portal 115 including AS module 120 in accordance with another embodiment. It should be readily apparent to those of ordinary skill in the art that web service portal 115 depicted in FIG. 3 represents a generalized schematic illustration and that other components may be added or existing components may be removed or modified.

As shown in FIG. 3, web service portal 115 can include a web store module 305 that a user can interface with the service portal. Web store module 305 can provide the graphical user interfaces ("GUIs") and associated functions and/or services for web service portal 115. As a non-limiting example, web store module 305 can generate a log-in GUI for a user to authenticate and enter web service portal 115.

Web store module 305 can couple with an application program interface ("API") module 310. API module 310 can be configured to provide an interface between the functions and/or services provided by web store module 305 and to the appropriate module of web service portal 115. More particularly, API module 310 can call or direct a requested function or service from the user to the respective module that provides that requested function or service. For example, a user may request a price of a product, e.g., product vending module, API module 310 can direct the request to a get price function in a support tools module 315. Additionally, a user may request a software appliance, API module 310 can direct the request to AS module 120.

API module 310 can also be configured to interface with support tools module 315. Support tools module 315 can be configured to provide the supporting software and hardware to implement the functionality of web service portal 115. Support tools module 315 can contain and provide access to databases that contain information such as products lines, software appliances services providers, on-line self-help (e.g., knowledgebase), etc. Support tools module 315 can also provide services like a chat services, a help desk, installation, provisioning, etc.

API module 310 can be further configured to couple with an identification ("ID") module 320. ID module 320 can be configured to provide identification management services for web service portal 115. ID module 320 can also store information related to users such as purchase history, user profile, usage history of the user, and entitlement data.

API module 310 can be further configured to couple with a universal messaging module 325. Universal messaging module 325 can be configured to provide a messaging application that unifies messages. More specifically, electronic mail ("email"), documents, and instant messaging can be linked in a single application. Universal messaging module 325 can also provide a mechanism for a user to view all the related documents for the user from email to Wiki pages.

An installer tools 330 can be coupled to API module 310. One of the services provided by web service portal 115 can be the purchase of software applications and software appliances provided by independent software vendors ("ISVs"). As part of the delivery of the software applications and appliances, the ISV can be required to maintain and update the installation tools to install their respective software applications and appliances. Accordingly, installer tools 330 can be a repository where independent software vendors can deposit their respective installation tools.

API module 310 can be further coupled to a communication layer 335 (labeled as COMM layer in FIG. 3). Communication layer 335 can be configured to provide the underlying services for the modules of web service portal 115 to communicate. For example, communication layer 335 can contain middleware for a product database to communicate with a graphical user interface requesting product description.

API module 310 can be further coupled to an application management module 340 (labeled as APP MGMT in FIG. 3). Application management module 340 can be configured to manage applications as requested by users. More specifically, a user may purchase a prepackaged software application pack (e.g., an operating system, electronic mail program and data mining program) from web service portal 115, which is stored in an application stack module 345. Application management module 340 can then deliver the purchased software stack, install and configure the software application stack at a third party site such as server farm 350 or store the software application stack in a storage farm 355 for the user to retrieve.

Server farm 350 can be configured to provide computing platforms for users to lease. Accordingly, users can have a backup version of their systems, a testing platform to perform quality assurance tests on new applications or new software appliances, execute a program requiring excessive MIPS, or any other similar computing task. Additionally, server farm 350 can be configured to store software appliances for download by users 105.

Storage farm 355 can be configured to provide storage space for users to lease. Accordingly, users can lease disk storage space to back up data, provide a hot data swap, or other storage intensive tasks. Additionally, storage farm 355 can be configured to store software appliances for download by users 105.

In some embodiments, AS module 120 can be configured to be executed in one of the other components (not shown). As illustrated, in other embodiments, AS module 120 can be executed as a standalone module.

Figure 4:
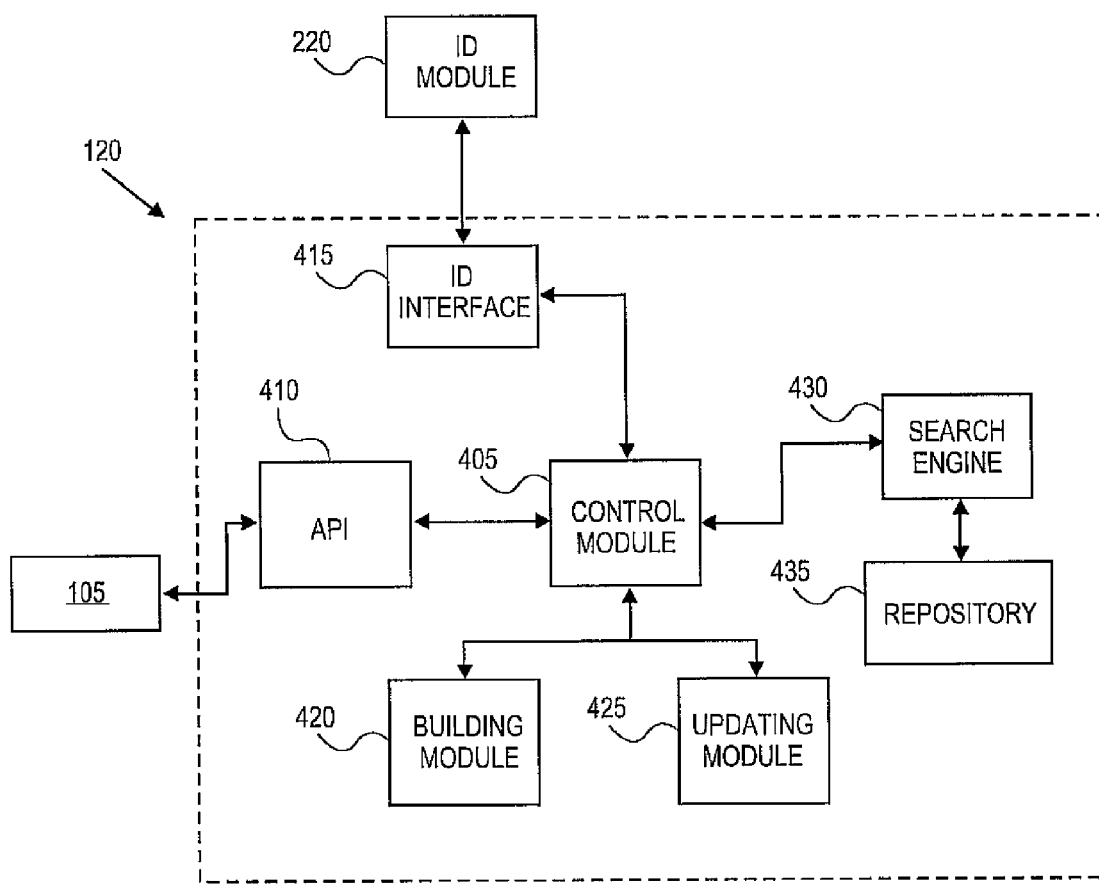
FIG. 4 depicts an exemplary AS module shown in FIG. 1 in accordance with yet another embodiment.

FIG. 4 depicts a more detailed block diagram of AS module 120 in accordance with another embodiment. It should be readily apparent to those of ordinary skill in the art that AS module 120 depicted in FIG. 4 represents a generalized schematic illustration and that other components may be added or existing components may be removed or modified.

As shown in FIG. 4, AS module 120 can comprise a control module 405, an application program interface ("API") 410, an identification ("ID") interface 415, a building module 420, an updating module 425, a search engine 420, and a repository 435. It should be readily obvious to one of ordinary skill in the art that the modules 405-435 can be implemented as software applications (programmed in C, C++, JAVA, PHP, etc.), hardware components (EEPROM, application specific integrated circuit, microprocessor, etc.) or combinations thereof.

Control module 405 can be configured to manage and interface with the other modules 410-435 to provide the functionality of the AS module 120 as described above and further described herein below. Additionally, control module 405 can be configured to interface with other modules such as ID module 320 via ID interface 415 as described above and further described herein below.

API 410 can be configured to generate GUIs, e.g. dialog boxes, web pages, as required by control module 405 and to provide an interface to other modules of web service portal 115. API 410 can be configured to operate in conjunction with web store 305 and API 310. For example, when a user 105 requests a software appliance related a service or product via web store 305, API 310 can pass the request to API 410. One skilled in the art will realize that API 410 is optional and that the functionality of API 410 can be performed by API 410.

According to embodiments, AS module 120 can be configured to receive a request for a software appliance. In particular, API 410 can be configured to receive a request for a software appliance via web service portal 115. The request can include a desired pre-built appliance or applications to be included in the custom appliance.

Figure 5A:
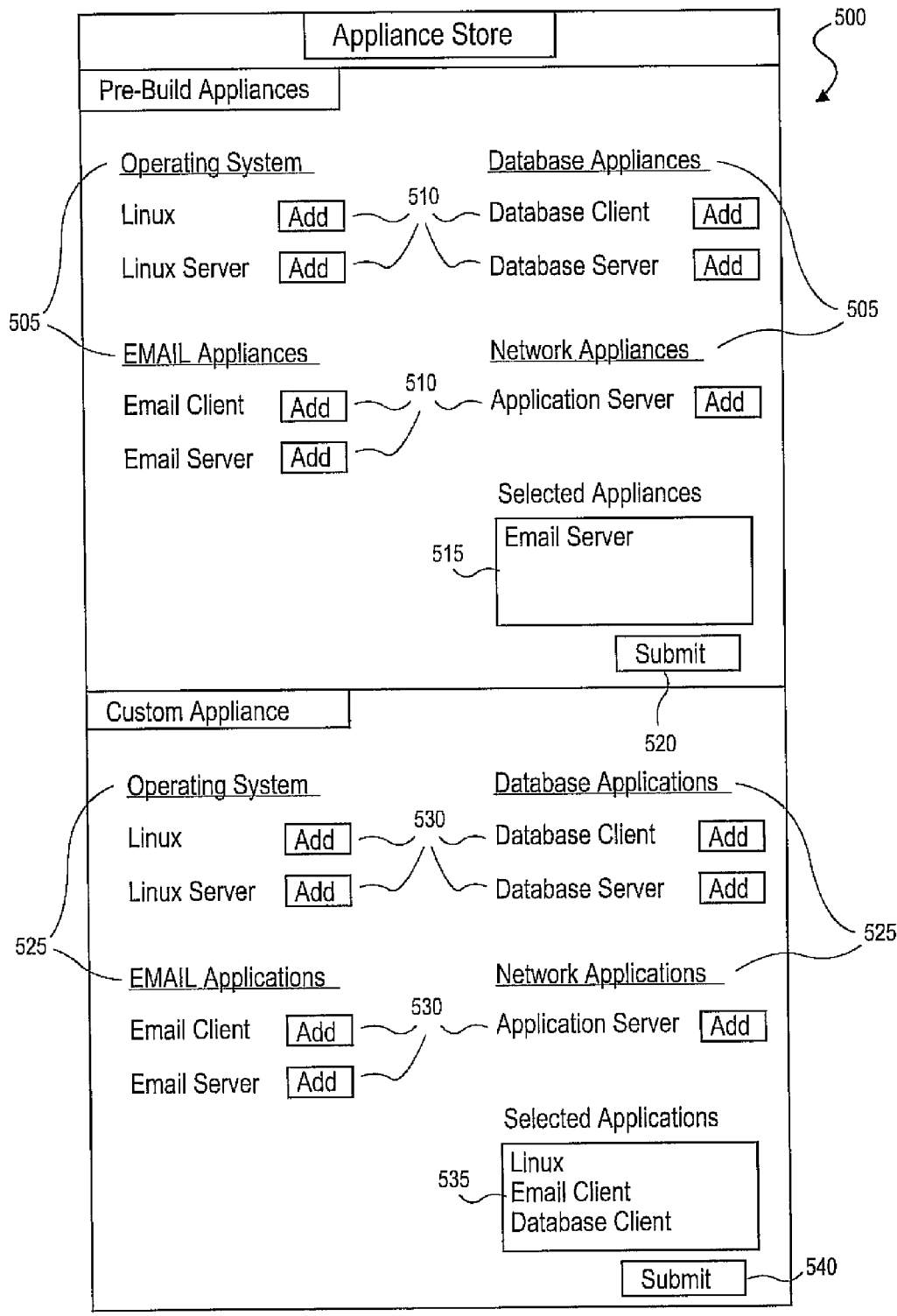
FIGS. 5A-5C illustrate an exemplary web site interfaces in accordance with yet another embodiment.

FIG. 5A shows an exemplary web page 500 generated by web store 305 to allow a user to request software appliances. As show, web page 500 includes appliance categories 505, appliance widgets 510, selected appliances window 515, appliance confirmation button 520, application categories 525, application widgets 530, selected applications widow 535, and application confirmation button 540.

As shown, web page 500 is configured to display the available pre-built appliances under categories 505. Pre-built appliances are displayed in categories 505 based on their associated functions. For example, category 505, which is labeled email appliances, can be configured to include the available Email related appliances: Email client and Email server.

Web page 500 is configured to associated with each available pre-built appliance a widget 510. Widget 510 allows the user to select a desired pre-built appliance to be provided. For example, if the user desires an Email server appliance, the user can select widget 510 associated with the Email server appliance.

Web page 500 is configured to display the pre-built appliances selected by the user in selected appliances window 515. For example, in the user selects an email server appliance, selected appliances window 515 can display "Email server" as being selected. Selected appliances window 515 can also be configured to be interactive. As such, a user can select an appliance displayed in selected appliances window 515 and remove the appliance if necessary. Once the user has made selections in web page 500, web store 305 can be configured to send the request for the selected pre-built appliances to AS module 120 upon selection of appliance confirmation button 520.

Web page 500 is also configured to allow the user to select individual applications to be included in a custom appliance. Web page 500 is configured to display the available applications under categories 525. Available applications are displayed in categories 525 based on their associated functions. For example, category 525, which is labeled email applications, can be configured to include the available Email related applications: Email client and Email server.

Web page 500 is configured to associate with each available application with a widget 530. Widget 530 allows the user to select the available applications to be included in the custom appliance. Web page 500 is configured to display the applications selected by the user in selected applications window 535. For example, if the user selects a Linux operating system, email client, and database client, selected applications window 535 can display "Linux, Email Client, Database Client" as being selected. Selected applications window 535 can also be configured to be interactive. As such, a user can select an application displayed in selected applications window 535 and remove the application if necessary. Once the user has made selections in web page 500, web store 305 can be configured to send the request for the custom appliance to AS module 120 upon selection of application confirmation button 540.

Likewise, API 410 can be configured to operate in conjunction with other modules of web service portal 115 such as universal messaging module 325. For example, a user 105 can submit a request for a software appliance in a message, such as an email. As such, API 310 can pass the request from universal messaging module 325 to API 410.

Control module 405 can be configured to receive the user's request for an appliance via API 410. The request can include a desired pre-built appliance or applications to be included in a custom appliance.

AS module 120 can be configured to build an appliance according to the request. In particular, control module 405 can be coupled to repository 435. Repository 435 can be implemented in any structure such as a database. For example, repository 435 can be implemented utilizing any type of conventional database architecture using open source technologies, proprietary technologies, or combinations thereof.

Repository 435 can be configured to store various pre-built software appliances based on the different functionally typically requested by users. For example, repository 435 can maintain various pre-built software appliances for roles such as Email Server appliance, application server appliance, customer relation management (CRM) appliance, enterprise resource planning (ERP) appliance, and the like. Repository 435 can be configured to store the binary image of the pre-built appliance. Likewise, repository 435 can be configured to store the bits that make up the binary image and a pre-built recipe that describes how to assemble the bits into the binary image.

As mentioned above in FIG. 2, the software appliance includes one or more application and MiniOS to support the applications. In addition to storing pre-built appliances, repository 435 can also be configured to store individual operating systems and individual applications. Repository 435 also can be configured to store versions of MiniOS to support individual applications. Repository 435 can be configured to store the individual applications, individual operating systems, and versions of MiniOS as separate binary images. Repository 435 can be configured to store the bits that make up the binary image of the individual applications, individual operating systems, and versions of MiniOS. Repository 435 can also be configured to store the recipe for the individual applications, individual operating systems, and versions of MiniOS.

Repository 435 can also be configured to store the operating requirements for the pre-built software appliances, the individual applications, individual operating systems, and versions of MiniOS. The operating requirements can include the minimum necessary computing requirements to utilize the pre-built software appliances, the individual applications, individual operating systems, and versions of MiniOS. For example, the operating requirements can include required storage space, required processing power, required execution memory, and the like.

In order to build the appliance, control module 405 can be configured to retrieve the pre-built appliance, the pre-built recipe, or the necessary components to build the custom appliance based on the request, from repository 435. In order to locate and retrieve the pre-built appliance, the pre-built recipe, or components of the custom appliance, control module 430 can be coupled to search engine 430. Search engine 430 can be configured to allow control module 430 to search repository 435. Search engine 430 can allow control module 430 to search the repository based on the contents of the request.

In order to build the requested appliance, control module 405 can be coupled to building module 420. After retrieving the pre-built appliance, the pre-built recipe or components of the custom appliance, control module 405 can be configured to pass the retrieved pre-built appliance, the pre-built recipe, or components of the custom appliance to building module 420.

Building module 420 can be configured to build the application based on request. If building module 420 receives a pre-built appliance from control module 405, building module 420 can be configured to generate a unique serial number for the pre-built appliance and append the serial number to the software appliance. The unique serial number serves to identify a particular instance of the software appliance. The unique serial number can be used in other process performed by AS module 120 such as updating and upgrading a software appliance.

Likewise, building module 420 can be configured to build the pre-built appliance based on the pre-built recipe. Building module 420 can be configured to retrieve the bits identified in the recipe and assemble the bits into the pre-built appliance. Building module 420 can be configured to append the serial number to the software appliance.

If building module 420 receives components to built a custom appliance, building module 420 can be configured to assemble the appliance from the bits of the binary images of the components. For example, if building module 420 receives an application and a version of MiniOS, building module 420 can be configured to combine the bits of the binary image of the application and version of MiniOS in order to create the binary image of the custom software appliance. Additional, if building module 420 receives an application and complete OS, building module 420 can be configured to generate a version of MiniOS to support the received application. Building module 420 can be configured to combine the bits of the binary image of the generated the version of the MiniOS and the received application. Building module 420 can also be configured to build the custom appliance based on the recipe of the components. Building module 420 can be configured to generate a unique serial number for the custom appliance and append the serial number to the custom appliance.

After building the appliance, building module 420 can be configured to return the complete appliance to control module 405. Control module 420 can be configured to determine the operational requirements for the complete appliance. Control module 420 can be configured to retrieve the stored operational requirements stored with the components making up the complete appliance from repository 435. If the complete appliance includes a pre-built appliance, control module 405 can be configured to determine that the operational requirements are the operational requirements of the pre-built appliance. If the complete appliance is a custom appliance, control module 405 can be configured to determine that the operational requirements are the operational requirements from the component with the greatest operational requirements.

Once control module 405 has the complete appliance and operational requirements, control module 405 can be configured to provide details of the complete appliance and operational requirements to the user for review. Control module 405 can pass the details and operational requirements to API 410. API 410 can be configured to instruct web store 305 to provide the details and operational requirements in a web page.

Figure 5B:
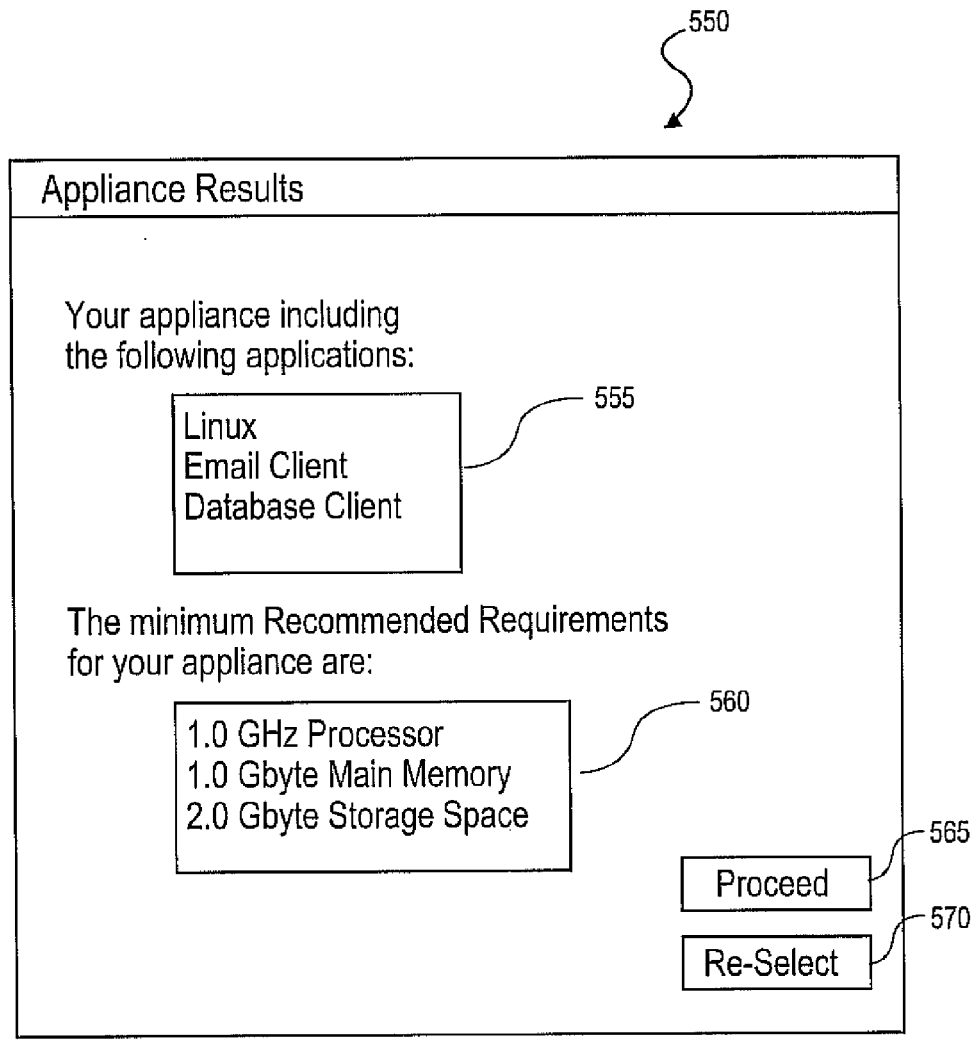

FIG. 5B shows an exemplary web page 550 for providing the details and requirements to the user. As shown, web page 550 a summary field 555, a requirements field 560, a proceed button 565, and re-select button 570.

Summary field 555 can be configured to display the details of the complete appliance. For example, if the user request a custom appliance including a Linux operating system, email client, and database client, summary field 555 can display "Linux, Email Client, Database Client" as a summary of the complete appliance.

Requirements field 560 can be configured to display the determined operational requirements for the complete appliance. For example, as shown, the operational requirements can be "1.0 Ghz processor, 1.0 Gbytes main memory, 2.0 Gbytes storage" which represents the required processing power, required execution memory, and required storage space, respectively.

Web page 550 can be configured to include a proceed button 565. If the user finds the complete appliance acceptable, proceed button 565 can be configured, when selected, to initiate the delivery of the complete appliance.

Web page 550 can be configured to include a re-select button 565. If the user finds the complete appliance unacceptable, re-select button 570 can be configured to re-initiate the process for requesting a software appliance. For example, the user may determine that the operational requirements are unacceptable. As such, web store 305 can be configured to generate a web page to allow the user to re-request the software appliance. For example, web store 305 can generate web page 500 and populated web page 500 with the user previous selections. As such, the user can modify the request for the software appliance.

Likewise, API 410 can be configured to operate in conjunction with other modules of web service portal 115 such as universal messaging module 325 in order to present the user with the complete appliance to review. API 410 can be configured to pass the complete appliance to universal messing module 305 in order to be transmitted to the user. For example, universal messaging module 305 can transmit the complete appliance to the user in an email message. The user can reply by sending a return email to proceed or to change the complete software appliance.

Once the user proceeds with a complete appliance, control module 405 can be configured to pass the appliance to API 410. API 410 can then be configured to provide the appliance to the user. API 410 can be configured to pass the complete appliance to universal messing module 325 in order to be transmitted to the user. For example, universal messaging module 325 can transmit the complete appliance to the user in an email message.

Additionally, API 410 can place the complete appliance on server farm 350 or storage farm 355 for downloading at a later time. As such, API 410 can instruct universal messaging module 325 to transmit a link to the user to allow the user to download the complete appliance. Also, API 410 can be configured to instruct web store 305 to provide the link in a web page.

Figure 5C:
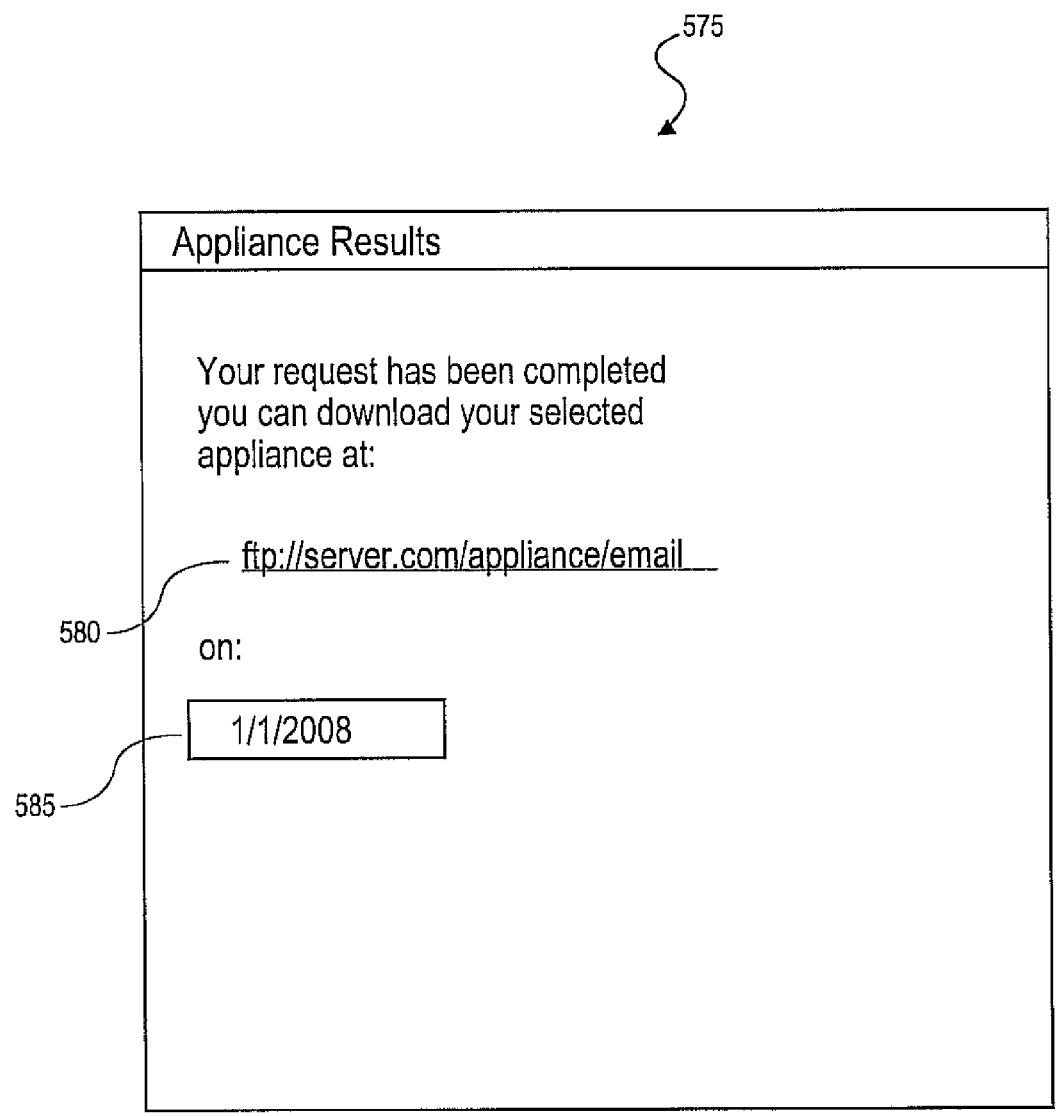

FIG. 5C shows an exemplary web page 575 for providing the link to the user. As shown, web page 575 includes the a link 580 and an availability date field 585. Link 580 is configured to allow the user to download the complete appliance from server farm 350 or storage farm 355. For example, by activating the link, the user's browser program can be configured to initiate a download process. Web page 575 can also be configured to include an availability date field 585. Field 585 is configured to display a date the complete appliance will be ready for download. For example, field 585 can display a date in the future or "immediately" if the complete appliance is ready for download.

In the building process described above, control module 405 can also be configured to include identifying information of the user in the complete software appliance. As such, control module 405 can be configured to append ID information of the user requesting the appliance to the complete appliance. To achieve this, control module 305 can be coupled to ID interface 415. ID interface 415 can be coupled to ID module 320 of web service portal 115. Control module can utilize ID interface 415 to retrieve the ID information for the user.

AS module 120 can be configured to maintain a record of appliances provided to users. In particular, control module 405 can be configured to generate a record of appliances provided to users. The record can include the all appliances provided to the user associated with the ID information of the user. The records can also include the unique serial numbers of the appliances. The records can also include the recipes of the appliances.

AS module 120 can also be configured to update and upgrade previously provided appliances. To achieve this, control module 405 can be coupled to updating module 425. Updating module 405 can be configured to update and upgrade software appliances by several different processes.

Since a software appliance is a binary image, updating module 405 can be configured to updated or upgrade a software appliance by creating a completely new binary image of the entire software appliance incorporating the updates or upgrades. To update or upgrade the software appliance using a complete image, updating module 425 can be configured to create the updated or upgraded appliance. AS module 120 can be configured to provide the updated or upgraded appliance to the user to simply replace the existing software appliance.

Alternatively, updating module 425 can be configured to update or upgrade a software appliance incrementally. For each update or upgrade, updating module 425 can be configured to determine the bits of the binary image required to update or upgrade a software appliance. AS module 120 can be configured to provide the update or upgrade bits to the user. To update or upgrade the software appliance, the user can add the update or upgrade bits to the software appliance on a binary-difference basis.

Figure 6:
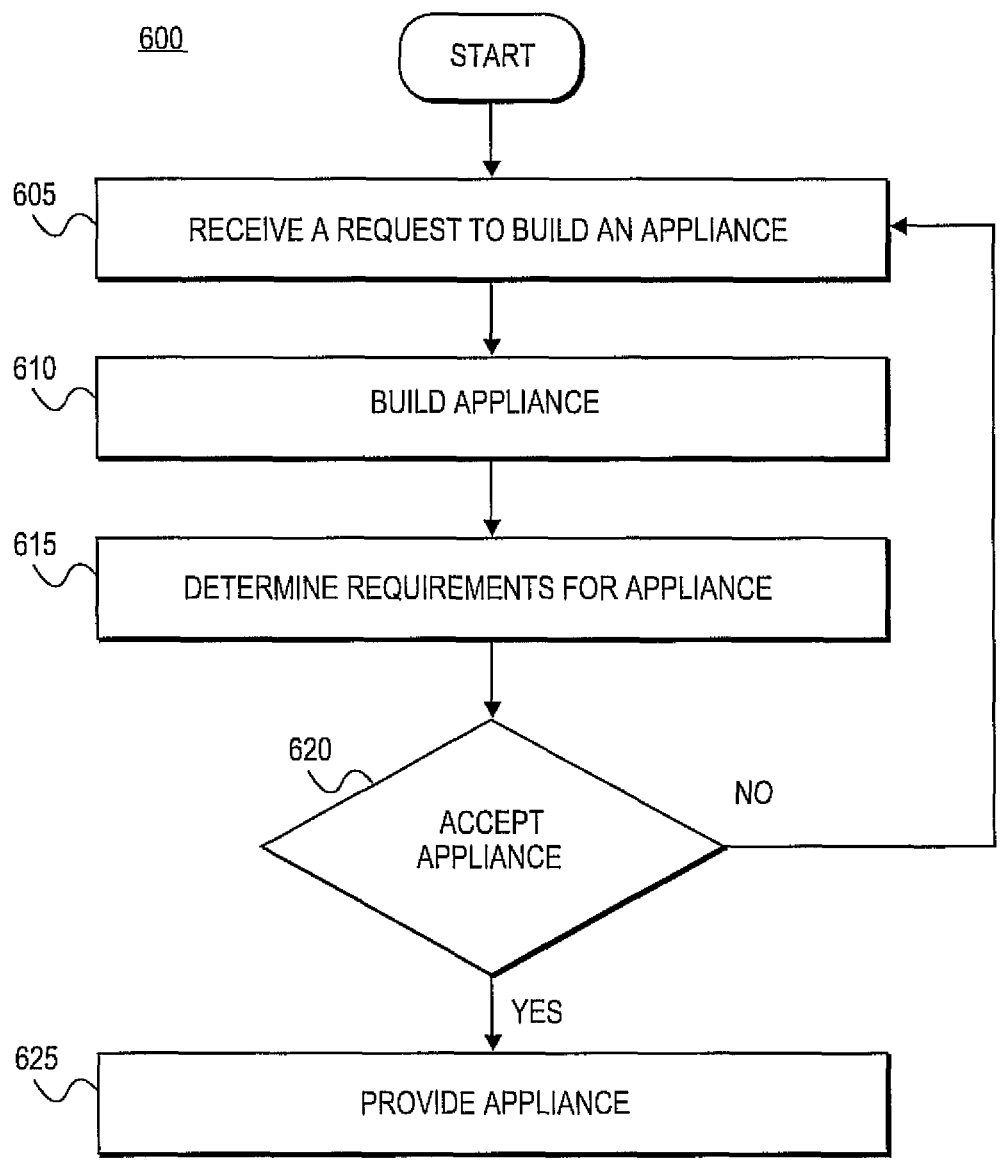
FIG. 6 depicts an exemplary flow diagram in accordance with yet another embodiment.

FIG. 6 illustrates a flow diagram 600 for providing a software appliance from AS module 120 in accordance with various embodiments. It should be readily apparent to those of ordinary skill in the art that the flow diagram 600 depicted in FIG. 6 represents a generalized schematic illustration and that other steps may be added or existing steps may be removed or modified.

As shown in FIG. 6, AS module 120 can be configured to receive a request for a software appliance, step 605. The request can include a desired pre-built appliance or available applications to be included in a custom appliance.

In response, in step 610, AS module 120 can build the requested appliance. AS module 120 can determine the software appliance by locating the pre-built appliance, pre-built recipe, or creating a custom appliance with applications that meet the request and MiniOS to support the applications.

In step 615, AS module 120 can determine the operating requirements of the complete appliance. The operating requirements can include the minimum necessary computing requirements to utilize the software appliance, such as required storage space, required processing power, required execution memory.

For example, AS module 120 can retrieve the stored operational requirements stored with the components making up the complete appliance from repository 435. If the complete appliance includes a pre-built appliance, AS module 120 can determine that the operational requirements are the operational requirements of the pre-built appliance. If the complete appliance is a custom appliance, AS module 120 can determine that the operational requirements are the operational requirements from the component with the greatest operational requirements.

Then, AS module 120 can pass details of the complete appliance and operational requirements to the user for review, in step 620. The user can accept the complete appliance or re-request the software appliance. If the user accepts the appliance, AS module 120 provides the complete appliance to the user, in step 625. If the user finds the complete appliance unacceptable, AS module can repeat process 600 beginning at step 605.

Figure 7:
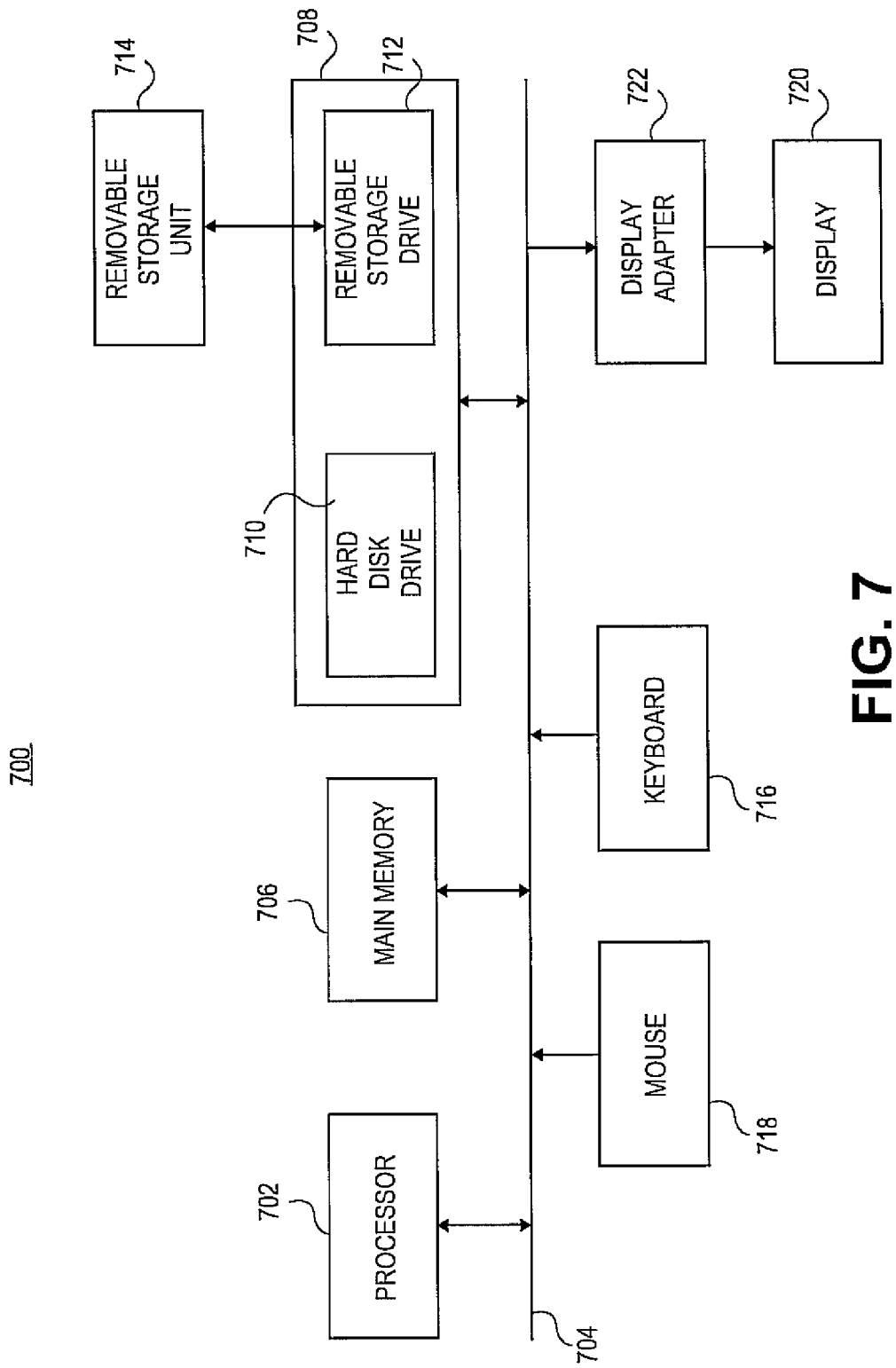
FIG. 7 depicts an exemplary computing platform in accordance with yet another embodiment.

FIG. 7 illustrates an exemplary block diagram of a computing platform 700 where an embodiment may be practiced. The functions of the AS module 120 can be implemented in program code and executed by computing platform 700. AS module 120 may be implemented in computer languages such as PASCAL, C, C++, JAVA, etc.

As shown in FIG. 7, computing platform 700 includes one or more processors, such as processor 702 that provide an execution platform for embodiments of AS module 120. Commands and data from processor 702 are communicated over a communication bus 704. Computing platform 700 also includes a main memory 706, such as a Random Access Memory (RAM), where AS module 120 can be executed during runtime, and a secondary memory 708. Secondary memory 708 includes, for example, a hard disk drive 710 and/or a removable storage drive 712, representing a floppy diskette drive, a magnetic tape drive, a compact disk drive, etc., where a copy of a computer program embodiment for AS module 120 can be stored. Removable storage drive 712 reads from and/or writes to a removable storage unit 714 in a well-known manner. A user interfaces with the AS module 120 with a keyboard 716, a mouse 718, and a display 720. Display adapter 722 interfaces with the communication bus 704 and display 720. Display adapter 722 also receives display data from processor 702 and converts the display data into display commands for display 720.

Additionally, software appliances including management tools, such as software appliance 200, can be implemented on an exemplary computing platform 700. For example, processor 702 can provide an execution platform for embodiments of the software appliance. The software appliance can be executed during runtime on main memory 706. The binary image of the software appliance can be stored in secondary memory 708.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method, comprising:
receiving, by a processing device, a request from an initiator, the request comprising functionality to be performed by a software appliance;
locating in a repository, by the processing device, an application capable of performing the requested functionality;
locating in the repository, by the processing device, a subset of components of an operating system necessary to provide an execution platform for the identified application;
combining, by the processing device, the identified application and the subset of components of the operating system to form the software appliance;
appending, by the processing device, an identifier to the software appliance;
determining, by the processing device, operational requirements for the software appliance, the operational requirements comprising a minimum amount of computing resources to support the software appliance;
providing, by the processing device, the operational requirements to the initiator of the request; and
receiving, by the processing device, a response to the operational requirements from the initiator of the request, the response comprising at least one of a confirmation to provide the software appliance or a request to modify the software appliance.

2. The method of claim 1, further comprising:
providing, by the processing device, the software appliance to the initiator when the response comprises the confirmation to provide the software appliance.

3. The method of claim 2, wherein the software appliance is a binary image of data embodying the software appliance.

4. The method of claim 3, wherein providing the software appliance comprises:
storing, by the processing device, the binary image in the repository; and
providing, by the processing device, a link to a location of the binary image in the repository.

5. The method of claim 3, wherein providing the software appliance comprises: transmitting, by the processing device, the binary image to the initiator of the request.

6. The method of claim 3, wherein providing the software appliance comprises: storing, by the processing device, the binary image on a computer readable medium.

7. The method of claim 1, further comprising:
receiving, by the processing device, a modified request for a modified software appliance when the response comprises the request to modify the software appliance, the request comprising modified functionality to be performed by the modified software appliance or a modified subset of components of the operating system;
building, by the processing device, the modified software appliance, the modified software appliance comprising:
a second application capable of performing the modified functionality and a subset of components of the operating system necessary to provide an execution platform for the second application, or
the application and the modified subset of components of the operating system;
determining, by the processing device, modified operational requirements for the modified software appliance, the modified operational requirements comprising a second minimum amount of computing resources to support the modified software appliance;
providing, by the processing device, the modified operational requirements to the initiator of the request; and
receiving, by the processing device, a second response to the modified operational requirements, the response comprising at least one of a confirmation to provide the modified software appliance or a request to modify the modified software appliance.

8. The method of claim 1, wherein building the software appliance comprises;
locating, by the processing device, a recipe of a pre-built software appliance in the repository, the recipe comprising instructions for constructing the pre-built software appliance; and
appending, by the processing device, an identifier to the pre-built software appliance.

9. An apparatus comprising:
a processing device;
a program interface executable by the processing device to receive a request, the request comprising functionality to be performed by a software appliance,
a building module executable by the processing device, the building module to:
locate, in a repository, an application capable of performing the requested functionality,
locate, in the repository, a subset of components of an operating system necessary to provide an execution platform for the application,
combine the application and the subset of components of the operating system to form the software appliance, and
append an identifier to the software appliance;
a control module executable by the processing device coupled to the program interface and the building module, the control module to determine operational requirements for the software appliance, the operational requirements comprising a minimum amount of computing resources to support the software appliance;
the program interface to provide the operational requirements to an initiator of the request and to receive a response to the operational requirements from the initiator of the request, the response comprising at least one of a confirmation to provide the software appliance or a request to modify the software appliance.

10. The apparatus of claim 9, the program interface to provide the software appliance to an initiator of the request when the response comprises the confirmation.

11. The apparatus of claim 10, the program interface to provide a link to a location of a binary image of data embodying the software appliance in the repository.

12. The apparatus of claim 10, the program interface to transmit a binary image of data embodying the software appliance to the initiator of the request.

13. The apparatus of claim 9, the program interface to receive a modified request for a modified software appliance when the response comprises the request to modify the software appliance, the request comprising modified functionality to be performed by the modified software appliance or a modified subset of components of the operating system;
  the building module to build the modified software appliance, the modified software appliance comprising:
  a second application capable of performing the modified functionality and a subset of components of the operating system necessary to provide an execution platform for the second application, or
  the application and the modified subset of components of the operating system; and
  the control module to determine modified operational requirements for the modified software appliance, the modified operational requirements comprising a second minimum amount of computing resources to support the modified software appliance, to provide the modified operational requirements to the initiator of the request, and to receive a second response to the modified operational requirements, the response comprising at least one of a confirmation to provide the modified software appliance or a request to modify the modified software appliance.

14. The apparatus of claim 9, the building module to locate a recipe of the pre-built software appliance in the repository, the pre-built recipe comprising instructions for creating the pre-built software appliance and to append an identifier to the pre-built software appliance.

15. A system comprising:
  a hardware network portal coupled to a network, the hardware network portal to provide products and services to the plurality of users, wherein the hardware network portal further comprises:
  a program interface to receive a request for a software appliance, the request comprising functionality to be performed by the software appliance;
  a building module to:
  locate, in a repository, an application capable of performing the requested functionality,
  locate, in the repository, a subset of components of an operating system necessary to provide an execution platform for the application,
  combine the application and the subset of components of the operating system to form the software appliance, and
  append an identifier to the software appliance,
  a control module coupled to the program interface and the building module, the control module to determine operational requirements for the software appliance, the operational requirements comprising a minimum amount of computing resources to support the software appliance;
  the program interface to provide the operational requirements to an initiator of the request and to receive a response to the operational requirements from the initiator of the request, the response comprising at least one of a confirmation to provide the software appliance or a request to modify the software appliance.

16. The system of claim 15, the program interface to provide the software appliance to an initiator of the request when the response comprises the confirmation.

17. The system of claim 16, the program interface to transmit a binary image of data embodying the software appliance to the initiator of the request.

18. The system of claim 15, the program interface to receive a modified request for a modified software appliance when the response comprises the request to modify the software appliance, the request comprising modified functionality to be performed by the modified software appliance or a modified subset of components of the operating system;
  the building module to build the modified software appliance, the modified software appliance comprising:
  a second application capable of performing the modified functionality and a subset of components of the operating system necessary to provide an execution platform for the second application, or
  the application and the modified subset of components of the operating system; and
  the control module to determine modified operational requirements for the modified software appliance, the modified operational requirements comprising a second minimum amount of computing resources to support the modified software appliance, to provide the modified operational requirements to the initiator of the request, and to receive a second response to the modified operational requirements, the response comprising at least one of a confirmation to provide the modified software appliance or a request to modify the modified software appliance.

19. The system of claim 15, the control module to locate a pre-built recipe of a pre-built software appliance in the repository, the pre-built recipe comprising instruction for creating the pre-built appliance; and
  the building module to append the identifying information of the initiator to the pre-built software appliance.

20. The system of claim 15, the program interface to provide a link to a location of a binary image of data embodying the software appliance in the repository.

21. A non-transitory computer readable medium including instructions that, when executed by a processing device, cause the processing device to perform operations comprising:
  receiving, by a processing device, a request for a software appliance from an initiator, the request comprising functionality to be performed by the software appliance;
  locating in a repository, by the processing device, an application capable of performing the requested functionality;
  locating in the repository, by the processing device, a subset of components of an operating system necessary to provide an execution platform for the application;
  combining, by the processing device, the application and the subset of components of the operating system to form the software appliance;
  appending, by the processing device, an identifier to the software appliance;
  determining, by the processing device, operational requirements for the software appliance, the operational requirements comprising a minimum amount of computing resources to support the software appliance;
  providing, by the processing device, the operational requirements to the initiator of the request; and
  receiving, by the processing device, a response to the operational requirements from the initiator of the request, the response comprising at least one of a confirmation to provide the software appliance or a request to modify the software appliance.

22. The non-transitory computer readable medium of claim 21, further comprising:
  receiving, by the processing device, a modified request for a modified software appliance, the request comprising modified functionality to be performed by the modified software appliance or a modified subset of components of the operating system;

building, by the processing device, the modified software appliance, the modified software appliance comprising:

a second application capable of performing the modified functionality and a subset of components of the operating system necessary to provide an execution platform for the second application, or the application and the modified subset of components of the operating system;

determining, by the processing device, modified operational requirements for the modified software appliance, the modified operational requirements comprising a second minimum amount of computing resources to support the modified software appliance;

providing, by the processing device, the modified operational requirements to the initiator of the request; and receiving, by the processing device, a second response to the modified operational requirements, the response comprising at least one of a confirmation to provide the modified software appliance or a request to modify the modified software appliance.

23. The non-transitory computer readable medium of claim 21, wherein building the software appliance comprises:

locating, by the processing device, a recipe of a pre-built software appliance in the repository, the recipe comprising instructions for constructing the pre-built software appliance; and appending, by the processing device, an identifier to the pre-built software appliance.

* * * * *